United States Patent [19]
Teitelbaum et al.

[11] 4,169,388
[45] Oct. 2, 1979

[54] INTEGRATED SPARK PLUG-COMBUSTION PRESSURE SENSOR

[75] Inventors: Bernard R. Teitelbaum, Birmingham, Mich.; John P. Carrico, Cockeysville, Md.

[73] Assignee: The Bendix Corporation, Southfield, Mich.

[21] Appl. No.: 968,959

[22] Filed: Dec. 13, 1978

[51] Int. Cl.² .............................................. G01L 9/08
[52] U.S. Cl. ......................................... 73/714; 73/115; 73/754; 73/DIG. 4
[58] Field of Search ............ 73/115, 714, 754, DIG. 4

[56] References Cited
U.S. PATENT DOCUMENTS

| | | | |
|---|---|---|---|
| 2,068,744 | 1/1937 | Gutzke | 73/714 |
| 3,020,763 | 2/1962 | Davis | 73/714 |

Primary Examiner—Donald O. Woodiel
Attorney, Agent, or Firm—James R. Ignatowski; Russel C. Wells

[57] ABSTRACT

An integrated spark plug-combustion pressure sensor capable of extended use in normal operation of an automobile. Thermally conductive gas sealing means are provided between the plug insulator and shell. A piezoelectric pressure sensor element is positioned to sense combustion pressure through changes in the stress of plug shell and is enclosed as an integral part of the plug for protection against the harsh engine environment.

7 Claims, 4 Drawing Figures

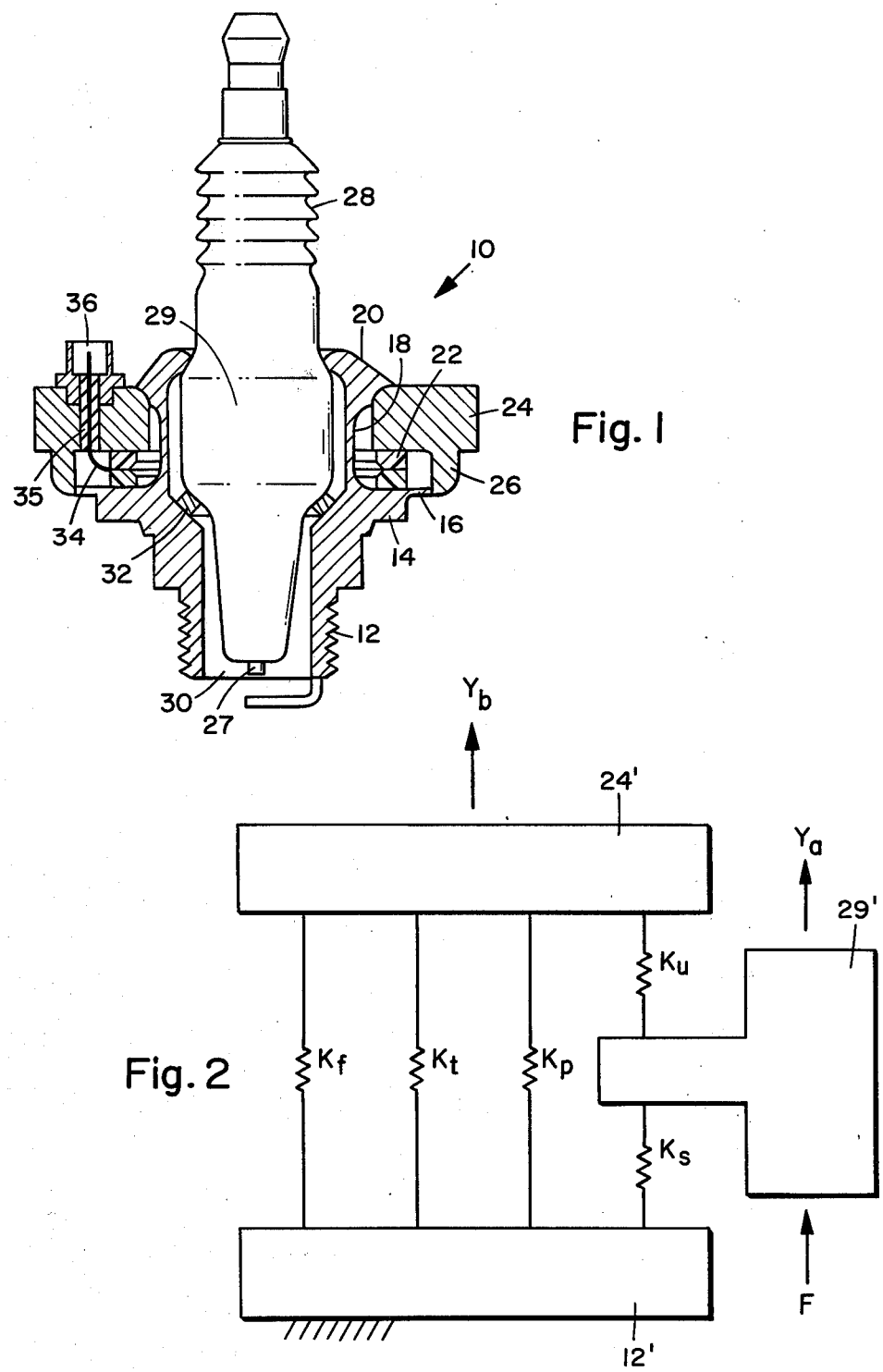

INTEGRATED SPARK PLUG-COMBUSTION PRESSURE SENSOR

The present invention relates to combustion pressure sensors for spark ignited internal combustion engines. More particularly, it relates to a pressure sensor of the piezoelectric type constructed integrally with an engine spark plug adapted to be directly substituted for a conventional spark plug.

Engine combustion chamber pressure has long been studied in testing and design laboratories as a measure of engine performance. Originally pressure sensors or indicators comprised a simple spring loaded piston arranged to be displaced proportionately to the chamber pressure. Improvements in engine design led to increases in chamber pressure and engine speeds beyond the capability of mechanical sensors to properly respond. Attention then turned to electrical transducers which are able to withstand comparatively high pressures and temperatures and which respond accurately to rapid fluctuations in pressure. Piezoelectric type transducers are of interest herein since these offer advantages in response characteristics and simplicity of application.

The advantage of combining a spark plug with a pressure sensor to eliminate the necessity to provide special gauge ports earlier has been recognized, for example, in U.S. Pat. No. 2,068,744, issued Jan. 26, 1937 to W. Gutzke. In the Gutzke sensor, a cylindrical shell, threaded at its lower end to fit an engine spark plug opening, carries an axially extending spark electrode. Surrounding the electrode and insulated therefrom is a piston-like sleeve which is exposed at the lower end to the cylinder pressure and which bears at its upper end on a piezoelectric sensor element. The sensor element, constrained between the shell and the sleeve, is variably stressed according to the pressure to which the sleeve is subjected thus producing an electrical signal proportional to the cylinder pressure.

Another form of a piezoelectric pressure sensor applicable to an unmodified engine is described in Society of Automotive Engineers publication no. 750,883, dated Oct. 13, 1975, titled "Indiscope-A New Combustion Pressure Indicator with Washer Transducers" by M. Kondo et al. In the Kondo et al sensor the piezoelectric element is formed in the shape of a washer which is substituted for the metal gasket used in many engines to effect a gas-tight seal between the spark plug shell and the cylinder head. Stress variations resulting from cylinder pressure changes are transmitted to the sensor by the minute deflections which occur in the spark plug shell while in use.

The above described devices would appear to be satisfactory for short term laboratory use. However, there has recently arisen a requirement for a sensitive, low noise, highly reliable combustion pressure sensor to provide one of the input parameters for an electronic fuel injection system. The electronic fuel injection system controls the air/fuel engine combustion mixture as a function of several continuously sensed engine parameters such as engine speed, manifold pressure, air density and other parameters, as in this case, combustion pressure. Sensors used in such service must possess a relatively long, trouble-free life, at least equal to that of a conventional spark plug. In combined spark plug-pressure sensors previously known attention has not been paid to the performance and reliability of one or the other of the elements of the combination. In the Gutzke sensor, referenced above, the piezoelectric sensor element appears to be adequately protected from the harsh engine environment and to provide means to transmit chamber pressure to the sensor element with adequate sensitivity. The spark electrode insulator, however, has insufficient mass and thermal contact with the cylinder head to insure adequate cooling and a life time comparable to that of a conventional spark plug.

On the other hand, the Kondo et al. sensor, referenced above, is employed in combination with a conventional spark plug so that no degradation in ignition performance or reliability is to be expected therefrom. The sensor, however, is inadequately protected from contaminants and no sensitive means for transmitting cylinder pressure to the sensor is provided. Thus, the production of low level, highly noisy signals and frequent replacement of the sensor is to be expected.

It is an object of the present invention to provide a combined spark plug-combustion pressure sensor capable of sustained use in an automobile engine for a period at least as long as a conventional spark plug.

It is another object of the invention to provide a spark plug-combustion pressure sensor of integrated construction having relatively high sensitivity to combustion pressure changes and having adequate cooling means for the spark plug insulator.

Briefly, the invention comprises a spark plug shell having a threaded lower end conforming to standard dimensions. Above the threaded portion the shell extends radially outward to form a shoulder and then continues upward with a wall substantially reduced in thickness from the thickness of the lower portion. The spark electrode insulator, as is conventional, is formed with a ribbed, generally cylindrical upper portion, a cylindrical medial portion of greater diameter than the upper portion and a tapered lower portion which extends downward through the lower threaded portion of the shell. A gas-tight, thermally conductive seal is positioned between the insulator and the shell at the lower end of the insulator medial portion. A piezoelectric element in the form of one or more pairs of stacked rings rests on the upper surface of the shell shoulder. A compression ring bears on the upper surface of the piezoelectric element. The upper end of the shell is rolled over and crimped against the upper edge of the insulator medial portion and against the upper surface of the compression ring to secure the insulator tightly in the shell and to stress the piezoelectric element in compression. Several alternate embodiments of the invention are disclosed.

In the drawings:

FIG. 1 is an elevation, partially in section, showing the integrated spark plug-combustion pressure sensor of the invention where the spark electrode insulator and gas seal are of conventional construction;

FIG. 2 is a schematic of an anolog of the invention useful in analyzing stress conditions at static equilibrium;

Figure 3:
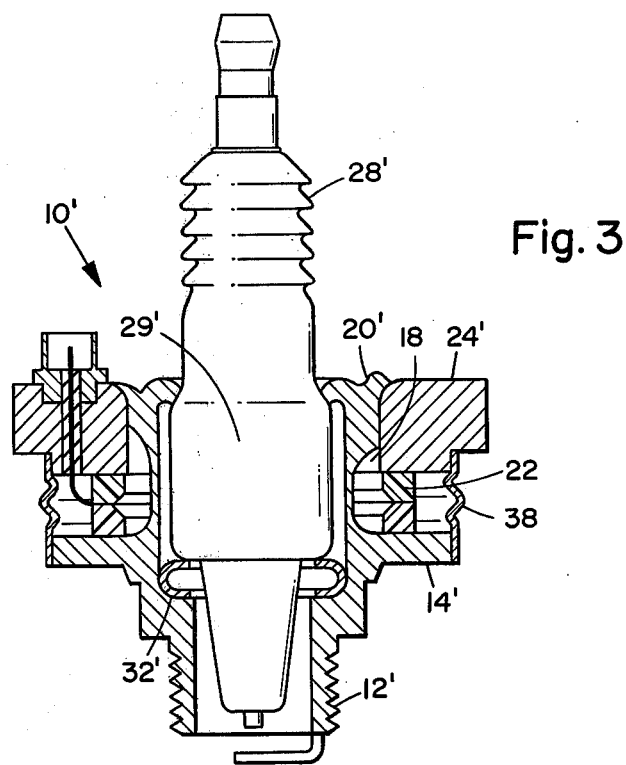
FIG. 3 is an elevation, partially in section, of the invention employing an insulator seal improved over the seal of FIG. 1.

FIG. 1 illustrates one embodiment of the invention wherein a cylindrical shell 10 is provided with a threaded lower portion 12 of substantial wall thickness. Above threaded portion 12 the shell wall extends laterally to form a shoulder 14. The outer edge of shoulder 14 is formed into a thin, relatively flexible lip 16. Above the shoulder 14 the shell extends with a relatively thin cylindrical section 18 which terminates in a crown portion 20 of more substantial thickness.

A pair of washer-like piezoelectric elements 22 rests on the upper surface of shoulder 14. The horizontal surfaces of each of the piezoelectric elements are conductively plated to form electrodes. The piezoelectric elements are so polarized that when the pair is compressively stressed like charges will appear on the surface of each of the elements at the interface therebetween. A compression ring 24, generally L-shaped in cross-section to provide a dependent rim portion 26, bears on the upper surface of the element pair 22. Rim portion 26 clears the outer vertical edge of the element pair 22 and is sealed at its lower end to the outer edge of lip 16 as by welding or cold forming.

A spark plug electrode 27 insulated by a conventional porcelain jacket having a ribbed upper portion 28, a bulging cylindrical medial portion 29 and a tapered lower portion 30 is mounted axially in shell 10 by inserting a circular steel gasket 32 at the lower edge of medial portion 29 of the insulator and by rolling over and crimping the crown portion 20 of the shell against the upper edge of the insulator medial portion. Simultaneously with forming the crimp against the insulator, the lower edge of crown 20 is crimped against the upper inner edge of ring 24. This operation tightly compresses the insulator against gasket 32 forming a gas-tight seal with good thermal conduction characteristics for transferring heat from the insulator through the threaded portion of the shell to the engine cylinder head. Also, in forming the crimps in crown 20, section 18 of the shell is stressed in tension which is balanced in part by compression of ring 24 and the piezoelectric elements 22. Elements 22 are thus preloaded in compression and when placed in operation increases in cylinder pressure tend to relieve the preload and induce an electrical signal at the element interface proportional to the cylinder pressure. This signal is conducted to the engine fuel control system, or elsewhere, by lead 34 which contacts the interface of elements 22 and passes through an insulating bushing 35 to an electrical connector contact 36. Obviously, this construction provides outstanding protection of the elements 22 against contamination or deterioration by gases and dirt surrounding the engine.

By drawing a mechanical analogy of the invention a way is pointed to further improvement in its sensitivity. FIG. 2 is a schematic of such an analogy. Corresponding parts of FIG. 1 are represented in FIG. 2 as follows: compression ring 24 is shown as block 24', threaded portion 12 appears as fixed block 12', the insulator is shown as 29' and the remaining elements are shown as compliances or springs having the spring rates listed below.

$K_p$—the piezoelectric elements 22
$K_s$—gasket 32
$K_u$—shell portion 20
$K_t$—shell portion 18
$K_f$—shell portion 16.

The piezoelectric elements must be loaded in compression. Increased cylinder pressure lessens the compression load and decreased cylinder pressure increases that load. Cylinder pressure variations are thereby transduced into analog electrical signals. Changes in the steady compression load will not affect the function of the sensor so long as the compression load does not go to zero or does not become great enough to crush the elements. Springs $K_s$ and $K_u$ are therefore compression springs, while $K_t$ is a tension spring. Spring $K_f$ results from flexure of the lip 16 and can be equivalent to a tension or compression spring, depending on the state of flexure when the lip 16 is sealed with rim portion 26. In any case, the magnitudes of the spring forces are such as to provide mechanical equilibrium, and the major tension force is provided by $K_t$.

The incremental force exerted on the spark plug insulator by cylinder pressure is denoted by the vector F. The corresponding incremental deflection of the insulator relative to shell section 12 is denoted by the vector $Y_b$. The magnitude of the sensor output signal is proportional to the incremental force F' on the piezoelectric element stack. F' is given by the equation:

$$F' = K_p Y_b. \quad (1)$$

A dimensionless sensitivity index, I, for the sensor may be expressed as:

$$I = F'/F. \quad (2)$$

I is necessarily less than unity but the closer to unity the index is the greater is the magnitude of signal for a given combustion pressure. In static equilibrium it can be shown that:

$$I = \frac{F'}{F} = \cfrac{1}{1 + \cfrac{K_t + K_f + K_s}{K_p} + \cfrac{K_s}{K_u}\left[1 + \cfrac{K_t + K_f}{K_p}\right]}.$$

The closer the quantities $(K_t + K_f + K_s)k_p$ and $$\frac{K_s}{K_u}\left[1 + \frac{K_t + K_f}{K_p}\right]$$

each approach zero, the closer the index I approaches unity.

Therefore, taking $K_p$ as given, it is desirable that the spring rates $K_t$, $K_f$ and $K_s$ each be small relative to $K_p$ and that $K_p$ be large. Since $K_s$, the spring rate of gasket 32 in the form shown in FIG. 1 is relatively large, the embodiment of FIG. 3, next to be described, employs a sealing means having a lower spring rate $K_s$ and consequently provides greater sensitivity.

Referring to FIG. 3, the shell 10' is similar to shell 10 of FIG. 1 except at the upper end of threaded portion 12' the inner wall has been squared off to provide a lower bearing surface for a gasket ring 32' having a C-shaped cross section. Likewise medial portion 29' of the insulator is squared off at its lower end to bear on the upper surface of gasket 32'. Lip 16 of FIG. 1 is eliminated and compression ring 24 is reshaped from its FIG. 1 equivalent to accomodate a thin walled cylindrical seal 38, preferably corrugated to increase flexibility, which is welded to the outer edge of shoulder 14' and the lower edge of ring 24' to seal and protect element 22 from the engine environment. Crown portion 20' is altered in shape from its FIG. 1 equivalent to provide a flange-like abutment against the upper medial portion of the insulator and against the compression ring, thereby reducing its flexure and increasing its spring rate, $K_u$. Also, corrugated seal 38 is more compliant than shell portion 16 of FIG. 1, reducing the spring rate $K_f$. The C-shaped cross-section of gasket 32' reduces its spring rate, $K_s'$ without reducing thermal conductivity between the insulator and shell and without sacrificing its ability to seal gases in the combustion chamber. In the latter regard, combustion gases impinging on the inner surface of the seal tend to expand the seal against the insulator and shell surfaces bearing thereon, improving the security of the seal.

Figure 4:
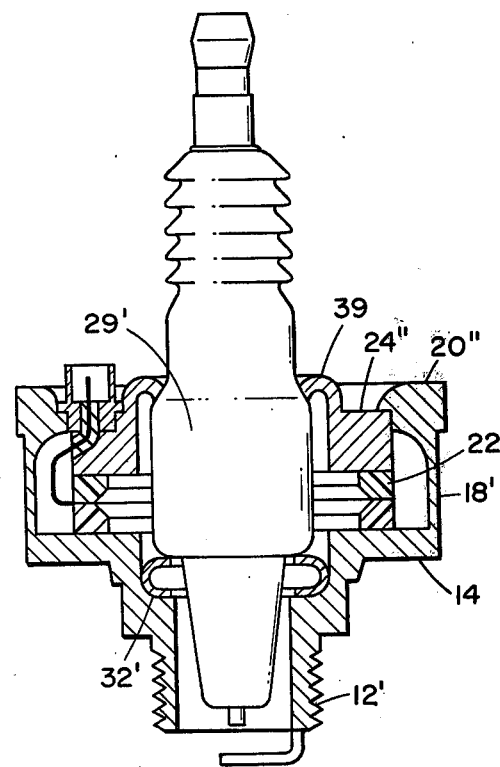
FIG. 4 is an elevation, partially in section, of a modification of the embodiment of FIG. 3.

A modification of the embodiment of the invention shown in FIG. 3 appears in FIG. 4. In FIG. 4, the lower threaded portion 12' of the shell, the C-shaped gasket 32' and the medial portion 29' of the insulator are unchanged from the FIG. 3 enbodiment. The medial portion 18' of the shell has been moved to the outer edge of shoulder 14 so as now to enclose elements 22, protecting the elements from the engine environment and eliminating seal 38 of FIG. 3. Compression ring 24 has been modified to include an upstanding cylindrical portion 39 at the upper inner periphery thereof which is rolled over and crimped against the upper edge of medial portion 29' of the insulator body. Crown portion 20'' of the shell now bears solely on the upper outer surfaces of ring 24''.

The embodiment of FIG. 4 represents a compromise of various factors entering into the design of the embodiment of FIG. 3. Although the FIG. 4 embodiment eliminates seal 38 thereby reducing spring rate $K_f$ to zero, which is desirable, crimp portion 39 enters into spring rate $K_u$. Crimp portion 39 and crown portion 20'' together are somewhat more compliant than crown portion 20' of FIG. 3 thereby reducing $K_u$, which will decrease the sensitivity somewhat. Also, since the medial portion 18' no longer separates the elements 22 from the insulator, the elements are exposed to a higher temperature level by heat radiated from the insulator.

The invention claimed is:

1. An integrated spark plug-combustion pressure sensor for a spark ignited internal combustion engine, comprising,
    a generally cylindrical shell having a threaded lower portion fitting a threaded opening in the engine combustion chamber, a shouldered bearing surface at the upper end of lower portion, a relatively thin-walled portion extending above said bearing surface and a crown portion at the upper end of said thin-walled portion;
    a generally cylindrical insulator inserted in said shell, said insulator having a tapered lower portion, a bulging medial portion and an upper portion;
    a spark electrode mounted axially within said insulator;
    a thermally conductive gas-tight seal inserted between said insulator and said shell so as to bear on said insulator in the vicinity of the intersection of said medial portion and said tapered portion of said insulator and to bear on said shell in the vicinity of the intersection of said threaded portion and said thin-walled portion of said shell;
    a pressure sensitive piezoelectric sensor element positioned on the upper surface of said shell shoulder;
    a compression ring positioned atop said sensor element and bearing thereon; said shell crown bearing on said ring and being formed so as to statically compress said ring against said sensor element and said insulator against said seal;
    means extending between said shell shoulder and said compression ring for enclosing said sensor element; and means for conducting an electrical signal from said sensor element to the exterior of said shell.

2. The spark plug-pressure sensor of claim 1 wherein said means enclosing said sensor element comprises, a flexible lip extending outwardly from said shell shoulder;
    a wall downwardly depending from said compression ring so as to clear the outer edge of said sensor element; and
    means securing said compression ring wall to said lip.

3. The spark plug-pressure sensor of claim 1 wherein said means enclosing said sensor element comprises, an axially extensible cylinder; and
    means securing the upper edge of said cylinder to said compression ring and the lower edge of said cylinder to said shell shoulder.

4. The spark plug-pressure sensor of claim 1 wherein said means enclosing said sensor element are comprised by said thin-walled portion of said shell, said thin-walled portion extending upwardly from the outer edge of said shell shoulder so as to clear the outer edge of said sensor element.

5. The spark plug-pressure sensor of claim 1 wherein said gas-tight seal comprises
    a ring having a C-shaped cross-section, the open edge of said C facing inwardly and facing said insulator.

6. An integrated spark plug-combustion pressure sensor for a spark ignited internal combustion engine, comprising
    a generally cylindrical shell having a threaded lower portion fitting into a threaded opening in the engine combustion chamber, a shoulder portion above said threaded portion, a relatively thin-walled medial portion above said shoulder portion and a crown portion at the upper end of said medial portion;
    a generally cylindrical insulator inserted in said shell, said insulator having a tapered lower portion, a bulging medial portion and an upper portion extending above said shell crown portion;
    a spark electrode mounted axially in said insulator and extending beyond each end of said insulator;
    a thermally conductive gas-tight seal inserted between said insulator and said shell, said seal being ring-shaped with a C-shaped cross-section and being inserted with the open end of said C-shape facing said insulator, said seal bearing on said insulator in the vicinity of the intersection of said medial portion and said lower portion of said insulator and bearing on said shell in the vicinity of the intersection of said shoulder portion and said lower portion of said shell;
    a ring shaped pressure sensitive piezoelectric sensor element positioned on said shoulder portion of said shell;
    a compression ring positioned atop said sensor; said shell crown bearing on the upper surface of said ring and on said insulator in the vicinity of the intersection of said medial and said upper portions of said insulator and being formed so as to compress said ring against said sensor and said insulator against said seal;
    an axially extensible cylinder secured at the lower edge thereof to said shell shoulder and at the upper edge thereof to said compression ring for enclosing said sensor element; and
    means for conducting an electrical signal from said sensor to the exterior of said shell.

7. An integrated spark plug-combustion pressure sensor for a spark ignited internal combustion engine, comprising a generally cylindrical shell having a threaded lower portion fitting a threaded opening in the engine combustion chamber, a shoulder portion above said threaded portion, a relatively thin-walled portion extending upwardly from the outer edge of said shoulder portion and a crown portion at the upper edge of said thin-walled portion;

a generally cylindrical insulator inserted in said shell, said insulator having a tapered lower portion extending into said shell lower portion, a bulging medial portion and an upper portion extending above said shell crown portion;

a spark electrode mounted axially in said insulator and extending beyond each end of said insulator;

a thermally conductive gas-tight seal inserted between said insulator and said shell, said seal being ring shaped with a C-shaped cross-section and being installed with the open end of said C-shape facing said insulator, said seal bearing on said insulator in the vicinity of the intersection of said medial portion and said lower portion of said insulator and bearing on said shell in the vicinity of the intersection of said shoulder portion and said lower portion of said shell; a ring shaped pressure sensitive piezoelectric sensor element positioned on said shoulder portion of said shell within said medial portion of said shell and with said insulator extending therethrough;

a compression ring positioned on said sensor and bearing on said insulator in the vicinity of the intersection of said medial portion and said upper portion of said insulator, said crown portion of said shell being formed so as to statically compress said ring against said sensor and said insulator against said seal; and means for conducting an electrical signal from said sensor to the exterior of said shell.

* * * * *